(12) United States Patent
Chang et al.

(10) Patent No.: US 9,838,517 B2
(45) Date of Patent: Dec. 5, 2017

(54) MOBILE TERMINAL WITHOUT MICROPHONE HOLE

(71) Applicant: Samsung Electronics Co., Ltd., Gyeonggi-do (KR)

(72) Inventors: Ju-Hee Chang, Gyeonggi-do (KR); Joon-Rae Cho, Seoul (KR); Jung-Ae Choi, Gyeonggi-do (KR); Ki-Won Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/802,131

(22) Filed: Jul. 17, 2015

(65) Prior Publication Data

US 2015/0326699 A1    Nov. 12, 2015

Related U.S. Application Data

(63) Continuation of application No. 13/428,667, filed on Mar. 23, 2012.

(30) Foreign Application Priority Data

Apr. 25, 2011  (KR) .................. 10-2011-0038214

(51) Int. Cl.
*H04M 1/02* (2006.01)
*H04R 1/06* (2006.01)
(Continued)

(52) U.S. Cl.
CPC ............. *H04M 1/026* (2013.01); *H04M 1/03* (2013.01); *H04R 1/06* (2013.01); *H04R 1/08* (2013.01)

(58) Field of Classification Search
CPC .......... H04M 1/026; H04M 1/03; H04R 1/06; H04R 1/08
(Continued)

(56) References Cited

U.S. PATENT DOCUMENTS 5,722,055 A     2/1998  Kobayashi et al.
7,400,937 B2 *  7/2008  Lapstun ................... B41J 3/445
                                                      455/3.06
(Continued)

FOREIGN PATENT DOCUMENTS

KR    10-0865147 B1    10/2008

OTHER PUBLICATIONS

Korean Search Report dated Mar. 30, 2017.
Korean Search Report, dated Sep. 25, 2017.

*Primary Examiner* — Nathan Taylor
(74) *Attorney, Agent, or Firm* — Cha & Reiter, LLC.

(57) ABSTRACT

A mobile terminal is provided that does not have a separate dedicated microphone hole. The mobile terminal preferably includes an ear jack assembly and a microphone unit. The ear jack assembly includes an ear jack plug insert hole. The microphone unit is disposed in a neighborhood of the ear jack assembly. The microphone unit is realized to use a microphone hole for receiving an external note also as an ear jack plug insert hole. Since a microphone hole for a speaker phone is excluded, the microphone unit is advantageous in space utilization, and can contribute to designing an elegance appearance of the mobile terminal. In addition, since the microphone unit is manufactured integrally with the ear jack assembly, manufacturing costs reduce and working efficiency may increase.

18 Claims, 5 Drawing Sheets

(51) Int. Cl.
   *H04R 1/08*      (2006.01)
   *H04M 1/03*      (2006.01)
(58) Field of Classification Search
   USPC .................................................. 455/569.1
   See application file for complete search history.

(56) References Cited

U.S. PATENT DOCUMENTS

| | | | | |
|---|---|---|---|---|
| 8,483,776 | B2* | 7/2013 | Murray | H04M 1/0202 |
| | | | | 181/156 |
| 2004/0137960 | A1* | 7/2004 | Chung | H04M 1/6058 |
| | | | | 455/569.2 |
| 2005/0233778 | A1* | 10/2005 | Rodman | H04B 1/40 |
| | | | | 455/569.1 |
| 2007/0026905 | A1* | 2/2007 | Murray | H04M 1/0202 |
| | | | | 455/570 |
| 2009/0033574 | A1 | 2/2009 | Hung | |
| 2009/0191927 | A1* | 7/2009 | Hong | H01R 13/5202 |
| | | | | 455/575.8 |
| 2010/0216526 | A1* | 8/2010 | Chen | H01R 13/66 |
| | | | | 455/575.1 |
| 2011/0019860 | A1* | 1/2011 | Birch | H04M 1/05 |
| | | | | 381/375 |
| 2013/0116014 | A1* | 5/2013 | Johnson | H04R 1/1041 |
| | | | | 455/569.1 |

\* cited by examiner

MOBILE TERMINAL WITHOUT MICROPHONE HOLE

CROSS REFERENCE TO RELATED APPLICATIONS

This application is a Continuation of U.S. patent application Ser. No. 13/428,667 filed on Mar. 23, 2012 which claims the benefit of priority under 35 U.S.C. §119(a) from Korean patent application Serial No. 10-2011-0038214 filed in the Korean Intellectual Property Office on Apr. 25, 2011, the entire disclosure of which is hereby incorporated by reference in its entirety.

BACKGROUND

1. Field of the Invention

The present invention relates to electronic devices such as a mobile terminal including at least one microphone unit. More particularly, the present invention relates to the efficient use of space of a mobile terminal.

2. Description of the Related Art

A mobile terminal not only provides basic voice communication with a counterpart user, but in recent years have been developed to also include a plurality of additional functions. For example, some of the additional functions including a digital camera module having of millions of pixels therein to capture an object or capture moving images, capabilities for downloading a sound source to listen to music, viewing television (TV) for sky waves, etc. The additional functions become diversified more and more and the volume of the mobile terminal is minimized to meet a user's desire.

In operating the above-described functions, the microphone unit is generally used in accordance with the additional functions. For example, the microphone unit is an indispensable element in the case of not only transmitting a terminal user's voice to a counterpart user during voice communication, but also for recording sounds while capturing moving images or using the mobile terminal as a voice recorder.

FIG. 1 is a perspective view illustrating a mobile terminal 100 according to the conventional art. A display unit 101 is installed on the front side of the mobile terminal, and a speaker unit 102 is installed above the display unit 101. In addition, a microphone unit applied to the mobile terminal is divided into a main microphone unit 103 for mounting the mobile terminal to a head portion and performing voice communication, and a sub microphone unit 104 for speaker phone communication. The main microphone unit 103 is installed in the lower portion of the mobile terminal 100, and the sub microphone unit 104 is installed in the upper portion of the mobile terminal 100. At this point, the sub microphone unit 104 may be formed in the neighborhood of an ear jack hole 105 formed for receiving an ear jack plug of an earphone unit (not shown).

Unsuccessful attempts to eliminate the microphone hole of the speaker unit 102, which is an ear piece for listening with the mobile terminal relatively close to the ear such as in a non-speakerphone telephone conversation, was to use the sub-microphone hole. However, there is a degree of difficulty in such an arrangement due to the speaker unit always being installed at a constant position occurs. Therefore, even when the sub-microphone hole is shared, an effect of a 2-microphone solution cannot be achieved. Consequently, a second microphone of the 2-microphone arrangement should be added to a different portion of the mobile terminal separately, which not only increases manufacturing costs but also is contradictory to an efficient space utilization, and simultaneously, the microphone hole spoils the elegance of the telephone's appearance.

SUMMARY

An exemplary aspect of the present invention is to address at least the above-mentioned disadvantages and to provide at least the advantages described below. Accordingly, an exemplary aspect of the present invention is to provide a mobile terminal without having a separately dedicated microphone hole. The present invention permits additional space for the mobile terminal by excluding the dedicated microphone hole.

Another exemplary aspect of the present invention is to provide a mobile terminal without a dedicated microphone hole, realized to contribute to designing of an elegant appearance of the mobile terminal by excluding the microphone hole.

Still another exemplary aspect of the present invention is to provide a mobile terminal without a dedicated microphone hole, realized to contribute to reduction of manufacturing costs by applying a microphone to an ear jack assembly to produce them in one unit.

In accordance with yet another exemplary aspect of the present invention, a mobile terminal is provided that includes an ear jack assembly including an ear jack plug insert hole, and a microphone unit disposed adjacent of the ear jack assembly, wherein the microphone unit is realized to use the insert hole for receiving an external sound and the insert holes doubles as an ear jack plug insert hole.

In addition, an exemplary embodiment of the present invention provides an ear jack assembly where the microphone unit and the ear jack plug insert hole are integrated. In accordance with another exemplary aspect of the present invention, an ear jack assembly is provided to an apparatus used for receiving an external sound. The ear jack assembly includes an ear jack plug insert hole for receiving an ear jack plug, and a microphone unit disposed in a neighborhood of the ear jack plug insert hole and using the ear jack plug insert hole as a microphone hole for receiving an external note, the ear jack plug insert hole and the microphone unit being integrated in one unit.

The above-described invention is applicable to various apparatuses having an ear jack assembly and a microphone unit together, such as, a mobile terminal for transmitting/receiving voice, and an MP3 player having a voice recorder function, just to name to possible electronic devices of the many devices that would benefit from the present invention.

Other exemplary aspects, advantages and salient features of the invention will become more apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will become more apparent to the artisan from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention as defined by the appended claims. Also, descriptions of well-known functions and constructions may be omitted for clarity and conciseness when their inclusion could obscure appreciation of the present invention by the person of ordinary skill in the art.

Though a hole for a sub-microphone unit for a speaker phone has been excluded in describing an exemplary embodiment of the present invention, a hole for a different microphone unit may also be excluded from the device. For example, in the case where an ear jack hole of a mobile terminal is installed in the lower portion, a hole for a main microphone for voice communication may be excluded from the device.

Figure 1:
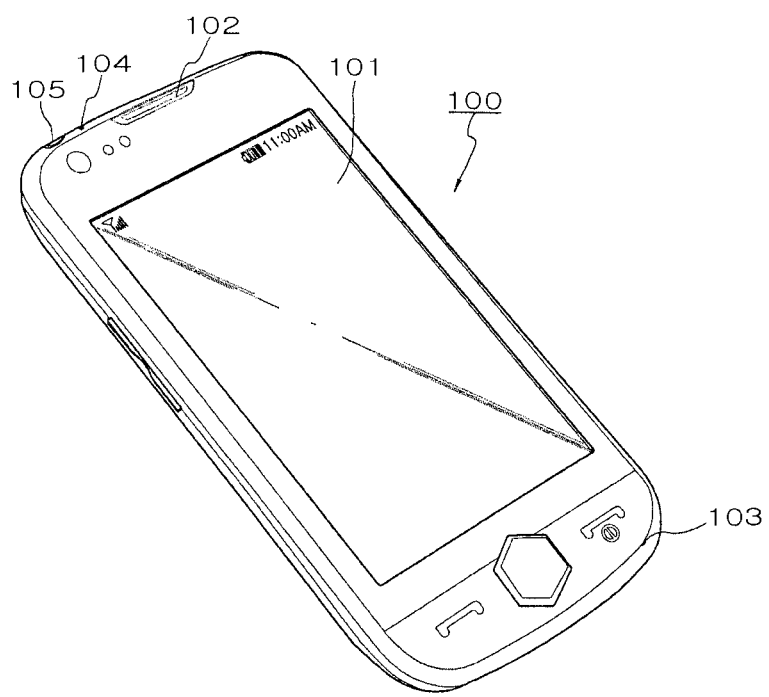
FIG. 1 is a perspective view illustrating the conventional mobile terminal.
Figure 2A:
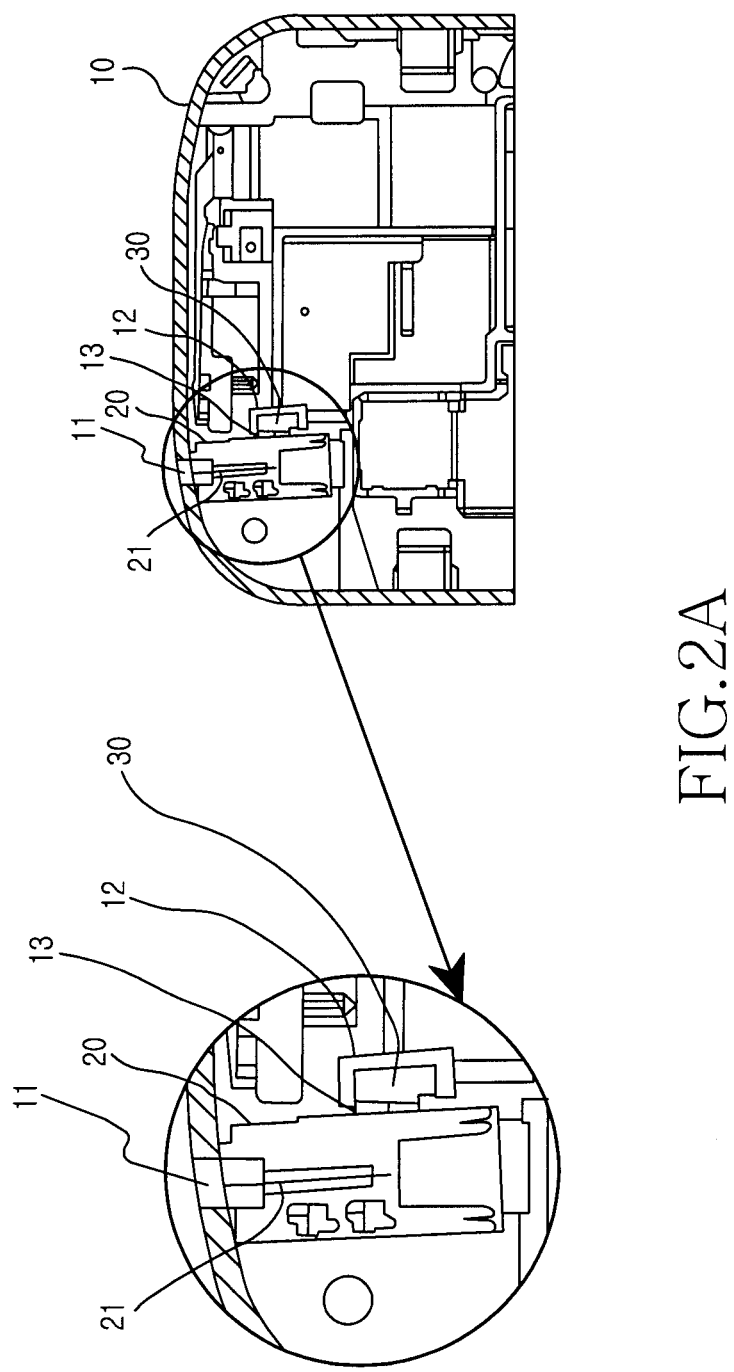
FIG. 2A and FIG. 2B are cross-sectional views illustrating a portion of a mobile terminal according to an exemplary embodiment of the present invention.
Figure 2B:
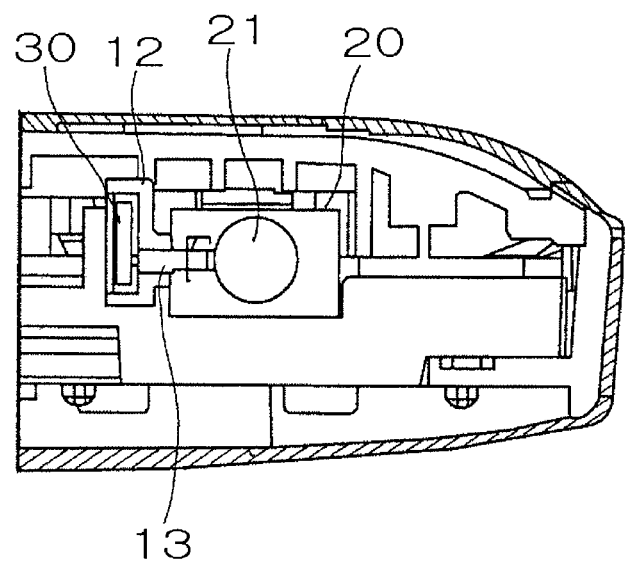

FIGS. 2A and 2B are cross-sectional views illustrating a portion of a mobile terminal according to an exemplary embodiment of the present invention.

As illustrated in FIGS. 2A and 2B, an upper portion of a case frame 10 of the mobile terminal is shown. An ear jack assembly 20 for receiving an ear jack plug of an earphone unit is installed inside the case frame 10. An ear jack plug insert hole 21 is formed in the ear jack assembly 20. Simultaneously, an opening 11 may be formed in a corresponding position of the case frame 10 to permit insertion of a jack.

A microphone unit 30 is installed in the neighborhood (i.e. adjacent) of the ear jack assembly 20. The microphone unit 30 may comprise a main microphone unit for voice communication or a sub-microphone unit for communication in a speaker phone mode depending on an installation position of the ear jack assembly 20. In the present drawing, a sub-microphone unit has been illustrated. The microphone unit 30 is separated from the ear jack assembly in this example by a microphone guide 13 and/or by a bushing 12 from the ear jack assembly unit. FIG. 2B provides a view where the microphone guide 13 is arranged relative to the ear jack insert hole 21 of ear jack assembly 21 and the microphone unit 30. For example, microphone guide 13 may be a hollow passageway between microphone unit 30 and the ear jack insert hole 21.

A magnified view for circled portion of FIG. 2A according to an exemplary embodiment of the present invention is also shown.

As stated above, an ear jack plug insert hole 21 is formed in the ear jack assembly 20. Simultaneously, an opening 11 may be formed in a corresponding position of the case frame 10 to permit insertion of a jack. A microphone unit 30 is installed in the neighborhood (i.e. adjacent) of the ear jack assembly 20. The microphone unit 30 may comprise a main microphone unit for voice communication or a sub-microphone unit for communication in a speaker phone mode depending on an installation position of the ear jack assembly 20. In the present drawing, a sub-microphone unit has been illustrated. The microphone unit 30 is separated from the ear jack assembly in this example by a microphone guide 13 and/or by a bushing 12 from the ear jack assembly unit.

According to an exemplary embodiment of the present invention, the microphone unit 30 is installed preferably in a position adjacent to the ear jack assembly 20 to exclude a microphone hole of the microphone unit 30 and uses the ear jack insert hole 21 of the ear jack assembly 20 as the microphone hole of the microphone unit 30. In other words, the ear jack insert hole 21 of the ear jack assembly serves two purposes, the second purpose being to provide a path for sound to the microphone. Therefore, the microphone unit 30 may be fixed using a predetermined bushing 12 formed in the case frame 10, and a microphone guide 13 may be installed or formed between the microphone unit 30 and the ear jack plug insert hole 21. The microphone guide 13 may be injection-molded together while the case frame 10 is molded, and a separate guide unit may be used.

Accordingly, in the case where the microphone unit 30 is used as a sub-microphone unit of the mobile terminal, the ear jack plug insert hole 21 of the ear jack assembly 20 may serve a dual or secondary purpose as a microphone hole used for the sub microphone unit. However, in the case where the ear jack plug is inserted into the ear jack plug insert hole 21 and operates, since the sub microphone unit for the speaker phone function does not operate when one is using an ear jack (speaker phone and ear jack functions are typically mutually exclusive of each other), and the use of the ear jack plug insert hole 21 for the ear jack does not interfere with the instance where the user wants to activate the speaker phone function.

Figure 3:
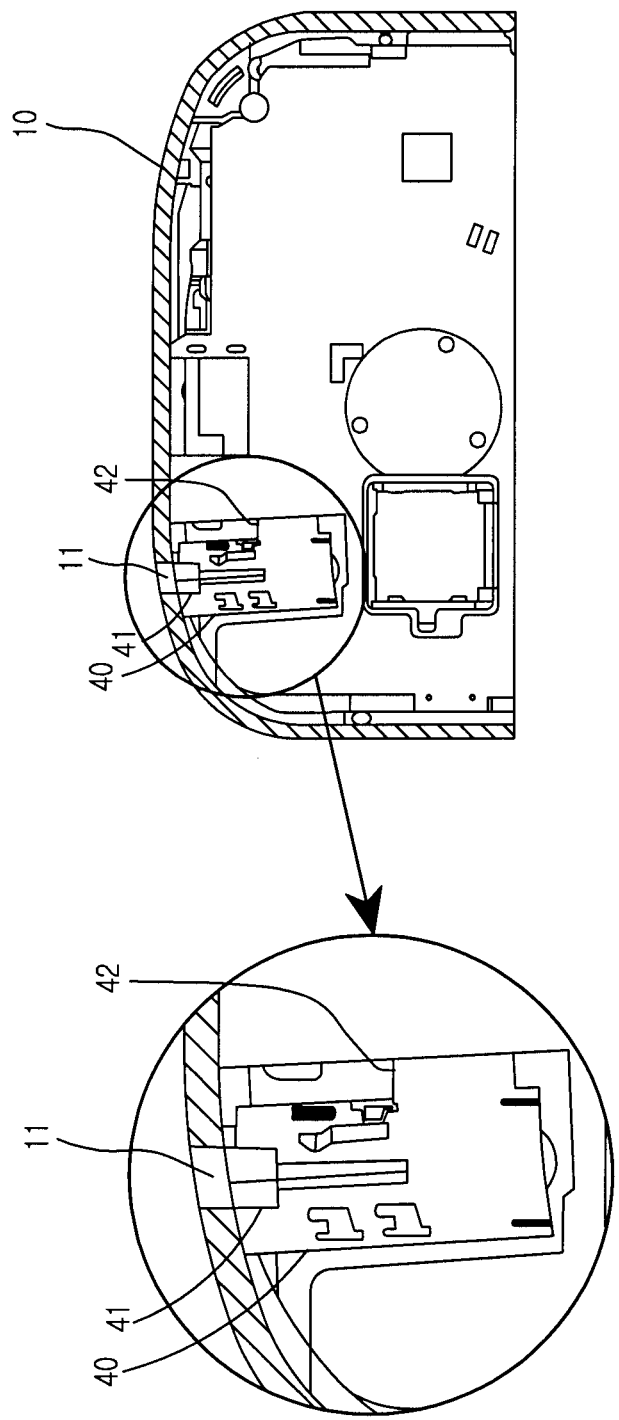
FIG. 3 is a cross-sectional view illustrating a portion of a mobile terminal according to an exemplary embodiment of the present invention.

FIG. 3 is a cross-sectional view illustrating a portion of a mobile terminal according to an exemplary embodiment of the present invention.

Referring now to FIG. 3, a microphone unit 42 according to an exemplary embodiment of the present invention may be disposed integrally within an ear jack assembly 40. In this case, no separate microphone guide is required. Since the microphone unit 42 is applied together while the ear jack assembly 40 is manufactured, a process becomes simple and manufacturing costs can be reduced. In addition, since a space for preparing a separate bushing for fixing the microphone unit is excluded, it will be very advantageous in an aspect of securing an installation space of other parts. For example, as in the case of FIG. 3, when the microphone unit 42 is designed integrally with the ear jack assembly 40, a space of about 0.02 cc may be secured. This space is a very advantageous to a terminal manufacturing company making efforts for a lightweight and slim profile in a small size in order to meet consumer increasing demand for lighter weight and smaller size devices.

A magnified view for circled portion of FIG. 3 according to an exemplary embodiment of the present invention is also shown.

The ear jack assembly 40 is mounted preferably in a Surface Mounted Device (SMD) type on a substrate. In this case, a plurality of pins (not shown) in the lower side may be fixed using soldering. The conventional ear jack assembly generally includes four pins of EAR_R, EAR_L, which are two sound signal lines for listening to stereo, EAR_MIC, which is a microphone signal line, and GND, which is a ground terminal. In the case where the microphone unit 42 according to an exemplary embodiment of the present invention is realized together with the ear jack assembly, six pins of EAR_R, EAR_L, which are two sound signal lines for listening to stereo, EAR_MIC, which is a microphone signal line, GND, which is a ground terminal, VCC for supplying power, and MIC+, which is a microphone signal line of the microphone unit are realized together and may be soldered on the substrate.

Figure 4A:
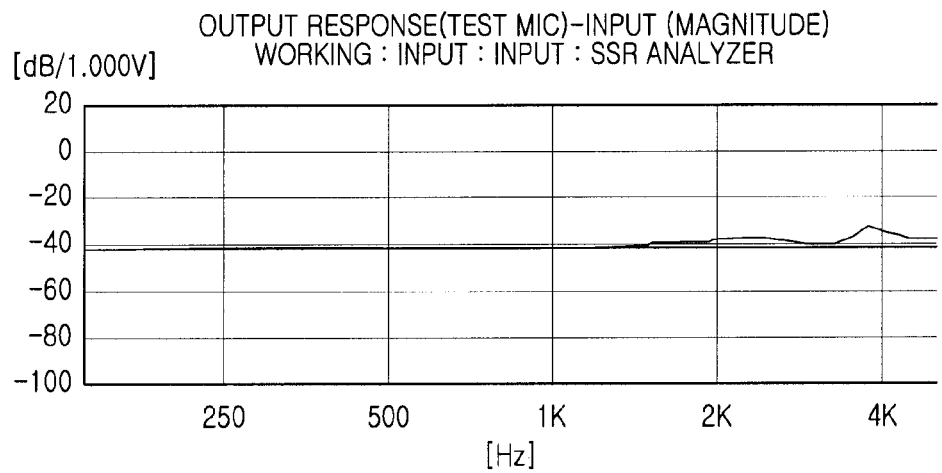
FIG. 4A and FIG. 4B are graphs comparing sensitivity for each frequency depending on a conventional device having a separate microphone hole versus a device without a separate microphone hole in which the microphone unit receives sound transferred from the ear jack insert hole according to an exemplary embodiment of the present invention.
Figure 4B:
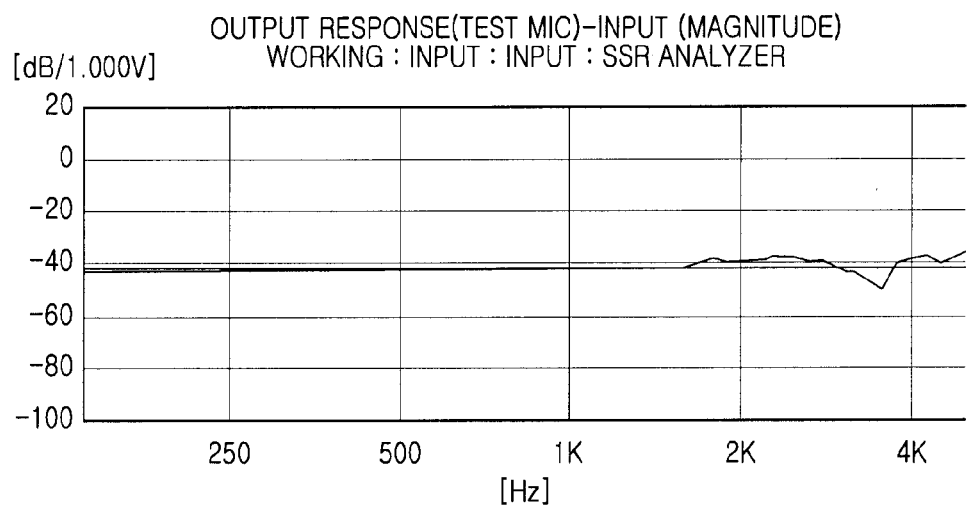

FIG. 4 is a graph comparing sensitivity in dB/1V for each frequency depending on existence of a microphone hole according to an exemplary embodiment of the present invention. FIG. 4A illustrates a sensitivity test result of the conventional microphone unit having a microphone hole separately, and FIG. 4B illustrates a sensitivity test result of a microphone unit in a device that does not have a separate microphone hole and uses an ear jack insert hole to transfer sound to the microphone unit according to an exemplary embodiment of the present invention.

Comparing FIGS. 4A and 4B, the sensitivity is the same up to about 3.5 KHz and a microphone unit according to an exemplary embodiment of the present invention shows attenuation of sensitivity by about 10 dB in the band of 3.8 KHz but this result does not have a great influence on a TX performance. In other words, even when a dedicated microphone hole is excluded from the structure and only an ear jack plug insert hole is used in substitution for a microphone hole according to an exemplary embodiment of the present invention, there is no adverse performance issues of the microphone unit.

Consequently, a mobile terminal according to an exemplary embodiment of the present invention excludes a separate or dedicated microphone hole for a speaker phone and is advantageous in space utilization, and can contribute to designing an elegance appearance of the mobile terminal without an adverse effect on performance. In addition, since the microphone unit can be manufactured integrally with the ear jack assembly, which can reduce manufacturing costs and increase operating efficiency.

Although the invention has been shown and described with reference to certain exemplary embodiments thereof, it will be understood by those skilled in the art that various changes in form and details may be made therein without departing from the spirit and scope of the invention as defined by the appended claims and their equivalents. For example, although the openings showed in the drawings are circular, other types of shapes are within the spirit and scope of the claimed invention, as the ear jack could have, or example a substantially rectangular construction. Therefore, the scope of the present invention should not be limited to the above-described embodiments but should be determined by not only the appended claims but also the equivalents thereof.

What is claimed is:

1. An audio jack module for a portable electronic device, the audio jack module comprising:
    an audio jack housing defining an audio plug insert hole dimensioned to receive an audio plug;
    an acoustic port formed through a sidewall of the audio plug insert hole, the sidewall forming an inside inner radius of the audio plug insert hole;
    an acoustic module housing, located as an integrated component of a housing of the portable electronic device, acoustically coupled with the acoustic port, the acoustic module housing dimensioned to contain an acoustic module therein; and
    an acoustic duct acoustically coupling the acoustic module housing with the acoustic port,
    wherein the acoustic duct is integrally formed together while the housing is formed, and
    wherein the audio jack housing is to be used as a passage to deliver an acoustic signal between the acoustic module and an external of the portable electronic device when the audio plug is absent.

2. The audio jack module of claim 1, wherein the acoustic module comprises a microphone unit.

3. The audio jack module of claim 1, wherein the acoustic module is indirectly coupled with the audio plug insert hole.

4. The audio jack module of claim 1, wherein the acoustic module housing defines a chamber around the acoustic module, the chamber including a top surface and a bottom surface positioned along opposing faces of the acoustic module.

5. The module of claim 4, wherein the acoustic module is connected with a top surface of the acoustic module housing and delivers sound waves toward a bottom surface of the acoustic module housing.

6. The audio jack module of claim 1, wherein the audio jack housing and the acoustic module housing are a single molded piece.

7. The audio jack module of claim 1, further comprising:
    a plurality of electrical contacts formed within the audio plug insert hole as to make electrical contact with the audio plug when inserted within the audio plug insert hole.

8. The audio jack module of claim 7, wherein the acoustic module is disabled when the electrical contact is made with the audio plug and the acoustic module is enabled when electrical contact is not made with the audio plug.

9. The audio jack module of claim 1, wherein the portable electronic device comprises a mobile communication device.

10. A portable electronic device comprising:
    an audio jack module and an acoustic module;
    the audio jack module including:
        an audio jack housing defining an audio plug insert hole dimensioned to receive an audio plug;
        an acoustic port formed through a sidewall of the audio plug insert hole, the sidewall forming an inside inner radius of the audio plug insert hole;
        an acoustic module housing, located as an integrated component of a housing of the portable electronic device, acoustically coupled with the acoustic port, the acoustic module housing dimensioned to contain the acoustic module therein; and
        an acoustic duct acoustically coupling the acoustic module housing with the acoustic port,
    wherein the acoustic duct is integrally formed together while the housing is formed, and
    wherein the audio jack housing is to be used as a passage to deliver an acoustic signal between the acoustic module and an external of the portable electronic device when the audio plug is absent.

11. The portable electronic device of claim 10, wherein the acoustic module comprises a microphone unit.

12. The portable electronic device of claim 10, wherein the acoustic module is indirectly coupled with the audio plug insert hole.

13. The portable electronic device of claim 10, wherein the acoustic module housing defines a chamber around the acoustic module, the chamber including a top surface and a bottom surface positioned along opposing faces of the acoustic module.

14. The module of claim 13, wherein the acoustic module is connected with a top surface of the acoustic module housing and delivers sound waves toward a bottom surface of the acoustic module housing.

15. The portable electronic device of claim 10, wherein the audio jack housing and the acoustic module housing are a single molded piece.

16. The portable electronic device of claim 10, further comprising:
   a plurality of electrical contacts formed within the audio plug insert hole as to make electrical contact with the audio plug when inserted within the audio plug insert hole.

17. The portable electronic device of claim 16, wherein the acoustic module is disabled when the electrical contact is made with the audio plug and the acoustic module is enabled when electrical contact is not made with the audio plug.

18. The portable electronic device of claim 10, wherein the portable electronic device comprises a mobile communication device.

\* \* \* \* \*